United States Patent
Cheng et al.

(10) Patent No.: US 8,532,489 B2
(45) Date of Patent: Sep. 10, 2013

(54) MULTI-FIBER TEN GIGABIT PASSIVE OPTICAL NETWORK OPTICAL LINE TERMINAL FOR OPTICAL DISTRIBUTION NETWORK COEXISTENCE WITH GIGABIT PASSIVE OPTICAL NETWORK

(75) Inventors: Ning Cheng, Sunnyvale, CA (US); Zhishan Feng, Santa Clara, CA (US); Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 634 days.

(21) Appl. No.: 12/709,563

(22) Filed: Feb. 22, 2010

(65) Prior Publication Data

US 2010/0226649 A1    Sep. 9, 2010

Related U.S. Application Data

(60) Provisional application No. 61/157,483, filed on Mar. 4, 2009.

(51) Int. Cl.
*H04J 14/00* (2006.01)
*H04J 14/02* (2006.01)

(52) U.S. Cl.
USPC .............................................. 398/72; 398/82

(58) Field of Classification Search
USPC ....................................................... 398/72, 82
See application file for complete search history.

(56) References Cited

U.S. PATENT DOCUMENTS

| | | | |
|---|---|---|---|
| 6,941,072 B2* | 9/2005 | Wu et al. | 398/83 |
| 7,389,048 B2* | 6/2008 | Kani et al. | 398/72 |
| 8,224,183 B1* | 7/2012 | Iannone et al. | 398/68 |
| 2002/0057868 A1* | 5/2002 | Wu et al. | 385/24 |
| 2004/0264963 A1* | 12/2004 | Kani et al. | 398/72 |
| 2009/0245790 A1* | 10/2009 | Mizutani et al. | 398/43 |
| 2010/0021164 A1* | 1/2010 | Luk et al. | 398/72 |

OTHER PUBLICATIONS

ITU-T G.984.5 (Sep. 2007) Series G: Transmission Systems and Media Digital Systems and Networks, Digital sections and digital line system—Optical line systems for local and access networks. Gigabit-Capable Passive Optical Networks (G-PON): Enhancement band.*

ITU-T G.984.5: Series G. Transmission Systems and Media, Digital Systems and Networks—Digital Systems and Digital Line System—Optical Line Systems for Local and Access Networks—Gigabit-capable Passive Optical Networks (GPON): Enhancement Band, (Sep. 2007).

(Continued)

*Primary Examiner* — Kenneth N Vanderpuye
*Assistant Examiner* — Abbas H Alagheband
(74) *Attorney, Agent, or Firm* — Conley Rose, P.C.; Grant Rodolph; John H. Scott, III

(57) ABSTRACT

An apparatus comprising a wavelength division multiplexing (WDM) coupler configured to couple an optical line terminal (OLT) comprising a transmitter and a receiver, wherein the WDM coupler is coupled to the transmitter via a first fiber and to the receiver via a second fiber. An apparatus comprising a WDM coupler for a passive optical network (PON) comprising a plurality of filters and a plurality of ports, wherein the WDM coupler comprises fewer filters than ports. A method comprising receiving a downstream optical signal intended for an optical network terminal (ONT) via a first fiber, and transmitting an upstream optical signal received from the ONT via a second fiber.

15 Claims, 9 Drawing Sheets

(56) References Cited

OTHER PUBLICATIONS

ITU-T G.984.5: Series G. Transmission Systems and Media, Digital Systems and Networks—Digital Systems and Digital Line System—Optical Line Systems for Local and Access Networks—Gigabit-capable Passive Optical Networks (GPON): Enhancement Band for Gigabit Capable Optical Access Networks—Amendment 1, (Oct. 2009).

"FSAN NG-PON White Paper," Edited by Anna Cui, Fabrice Bourgart, Frank Effenberger, Junichi Kani, and Hiroaki Mukai, Apr. 2009.

* cited by examiner

MULTI-FIBER TEN GIGABIT PASSIVE OPTICAL NETWORK OPTICAL LINE TERMINAL FOR OPTICAL DISTRIBUTION NETWORK COEXISTENCE WITH GIGABIT PASSIVE OPTICAL NETWORK

CROSS-REFERENCE TO RELATED APPLICATIONS

The present application claims priority to U.S. Provisional Patent Application 61/157,483, filed Mar. 4, 2009 by Ning Cheng et al., and entitled "Multi-Fiber Ten Gigabit Passive Optical Network Optical Line Terminal for Optical Distribution Network Coexistence with Gigabit Passive Optical Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network terminals (ONTs) at the customer premises. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, some emerging PON systems are being reconfigured to transport the data frames with improved reliability and efficiency at higher bandwidths, for example at about ten Gbps. The integration and compatibility of such emerging systems with current PON systems is one aspect of the system that is being considered.

SUMMARY

In one embodiment, the disclosure includes an apparatus comprising a wavelength division multiplexing (WDM) coupler configured to couple an OLT comprising a transmitter and a receiver, wherein the WDM coupler is coupled to the transmitter via a first fiber and to the receiver via a second fiber.

In another embodiment, the disclosure includes an apparatus comprising a WDM coupler for a PON comprising a plurality of filters and a plurality of ports, wherein the WDM coupler comprises fewer filters than ports.

In yet another embodiment, the disclosure includes a method comprising receiving a downstream optical signal intended for an ONT via a first fiber, and transmitting an upstream optical signal received from the ONT via a second fiber.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

One emerging PON system is the ten Gbps GPON (XG-PON), which may have a downstream bandwidth of about ten Gbps and an upstream bandwidth of at least about 2.5 Gbps. The XGPON may be deployed to satisfy higher bandwidth demands than may be allowed by current PON systems. However, to reduce cost and facilitate system and bandwidth upgrade, the XGPON may share some network infrastructure and resources with other PON systems, which may include PON systems that have been previously installed and operated. The integrated XGPON/PON system may support the higher bandwidth demands using XGPON wavelength channels, which may be different than the existing PON wavelength channels.

Disclosed herein are systems and apparatus for improving the integration between XGPON systems (or other next generation access (NGA) systems) and current PON systems, such as GPONs. Accordingly, an integrated XGPON/PON system may be used, which may comprise two separate OLTs, e.g. a XGPON OLT and a PON OLT, a shared ODN and a plurality of ONTs. The XGPON OLT and the PON OLT may be coupled to a coupler, e.g. located at the central office (CO) or in the ODN, which may comprise a plurality of filters to switch the different downstream and upstream wavelength channels between the XGPON OLT and a XGPON ONT and between the PON OLT and a GPON ONT. The XGPON OLT may be coupled to the coupler by two separate fibers for downstream and upstream transmissions, where a first fiber may be coupled to a transmitter and a second fiber may be coupled to a receiver in the XGPON OLT. Using two separate fibers instead of a shared fiber for downstream and upstream transmissions in the XGPON OLT may reduce the quantity of filters in the coupler, e.g. by about one, and therefore reduce system cost and losses. Additionally, separating downstream and upstream transmissions into two fibers may cancel the need for a filter in the XGPON OLT to split the downstream and upstream transmissions in a shared fiber.

Figure 1:
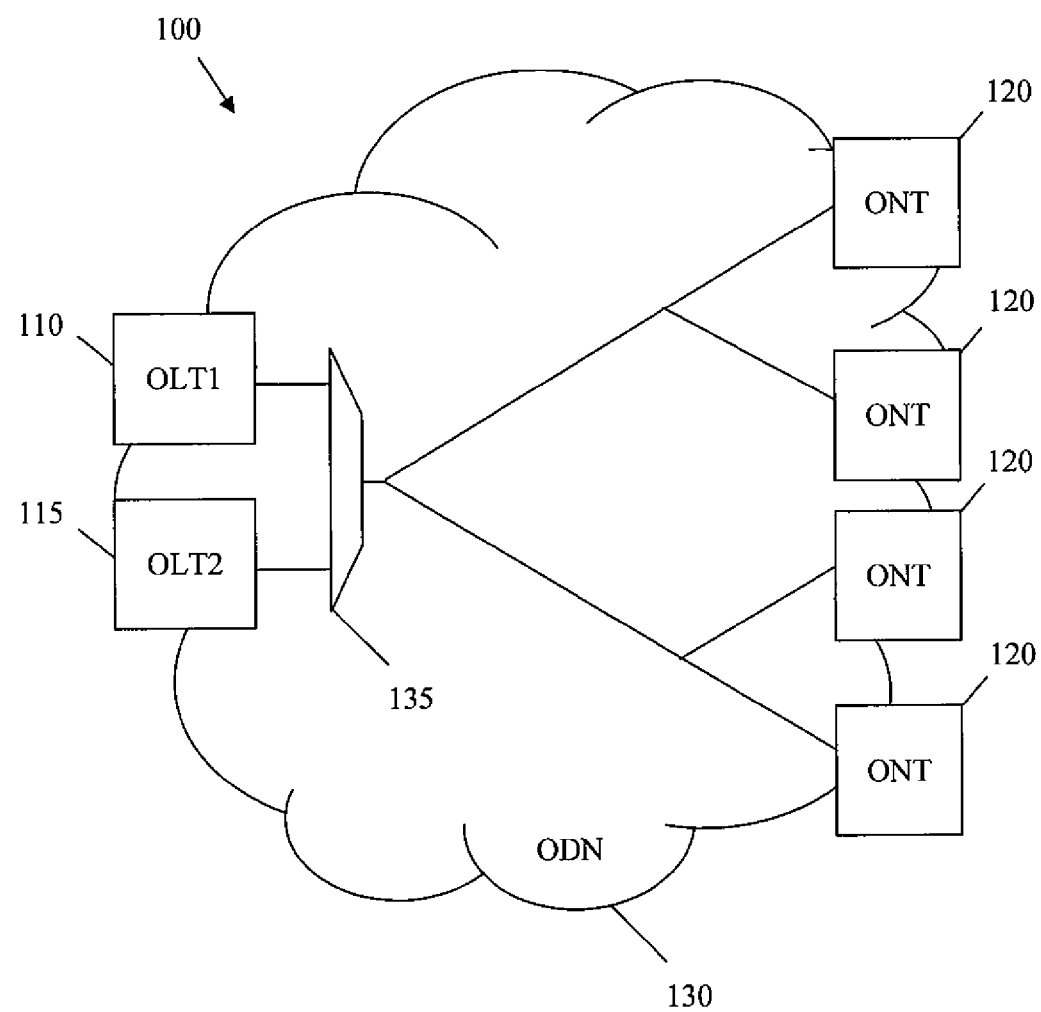
FIG. 1 is a schematic diagram of an embodiment of a PON system.

FIG. 1 illustrates one embodiment of a PON system 100, which may be an integrated XGPON (or NGA) and PON system. The PON system 100 may comprise a first OLT 110 (OLT1), a second OLT 115 (OLT2), a plurality of ONTs 120, and an ODN 130, which may be coupled to the first OLT 110 and the second OLT 115 on one side and the ONTs 120 on an opposite side. The PON system 100 may be a communications network that does not require any active components to distribute data between the first OLT 110, the second OLT 115, and the ONTs 120. Instead, the PON system 100 may use the passive optical components, such as a coupler 135, in the ODN 130 to distribute data between the first OLT 110, the second OLT 115, and the ONTs 120.

Some components of the PON system 100, e.g. the first OLT 110, the ODN 130, and at least some of the ONTs 120 may be configured to support current PON technology requirements. For instance, such components may be configured for Ethernet PONs (EPONs) defined by the Institute of Electrical and Electronics Engineers (IEEE) 802.3ah standard, 10 Gigabit EPONs as defined by the IEEE 802.3av standard, asynchronous transfer mode PONs (APONs), broadband PONs (BPONs) defined by the International Telecommunication Union (ITU) Telecommunication Standardization Sector (ITU-T) G.983 standard, GPONs defined by the ITU-T G.984 standard, or WDM PONs (WPONs), all of which are incorporated herein by reference as if reproduced in their entirety. Additionally, the PON system 100 may comprise some components, e.g. the second OLT 115, the ODN 130, and at least one of the ONTs 120, which may be configured to support a plurality of XGPON (or NGA) bandwidths and wavelength channels.

In an embodiment, the first OLT 110 and the second OLT 115 may be any devices that are configured to communicate with the ONTs 120 and possibly another network (not shown). Specifically, the first OLT 110 and/or the second OLT 115 may act as an intermediary between the other network and the ONTs 120. For instance, the first OLT 110 and/or the second OLT 115 may forward data received from the network to the ONTs 120, and forward data received from the ONTs 120 onto the other network. When the other network is using a network protocol, such as Ethernet or Synchronous Optical Networking/Synchronous Digital Hierarchy (SONET/SDH), that is different from the PON protocol used in the PON system 100, the first OLT 110 and/or the second OLT 115 may comprise a converter that converts the network protocol into the PON protocol. The converter may also convert the PON protocol into the network protocol. The first OLT 110 and the second OLT 115 may be typically located at a central location, such as a CO, but may be located at other locations as well. In an embodiment, the distributor coupler 135 may be located with the first OLT 110 and the second OLT 115 at the CO.

The specific configuration of the first OLT 110 and the second OLT 115 may vary depending on the types of PONs associated with each OLT. Specifically, the second OLT 115 may be configured to support higher downstream and upstream bandwidth (e.g. for the ONTs 120) and different wavelength channels than the first OLT 110. For instance, the second OLT 115 may be configured for XGPON system bandwidth capabilities and the first OLT 110 may be configured for GPON bandwidth capabilities, as described in detail below. The first OLT 110 and second OLT 115 may each comprise a transmitter and a receiver, which may be configured for the corresponding bandwidth and wavelength requirements.

In an embodiment, the ONTs 120 may be any devices that are configured to communicate with the first OLT 110 and/or the second OLT 115 and to a customer or user (not shown). Specifically, the ONTs 120 may act as an intermediary between the first OLT 110 and/or the second OLT 115 and the customer. For instance, the ONTs 120 may forward data received from the first OLT 110 and/or the second OLT 115 to the customer, and forward data received from the customer onto the first OLT 110 and/or second OLT 115. Although the specific configuration of the ONTs 120 may vary depending on the type of PON system 100, in an embodiment, the ONTs 120 may comprise an optical transmitter configured to send optical signals to the first OLT 110 and/or second OLT 115 and an optical receiver configured to receive optical signals from the first OLT 110 and/or second OLT 115. Additionally, the ONTs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONTs 120 and optical network units (ONUs) are similar, and thus the terms are used interchangeably herein. The ONTs 120 may be typically located at distributed locations, such as the customer premises, but may be located at other locations as well.

In an embodiment, the ODN 130 may be a data distribution system that may comprise optical fiber cables, couplers, splitters, distributors, and/or other equipment, which may be passive optical components. Specifically, the optical fiber cables, couplers, splitters, distributors, and/or other equipment may be components that do not require any power to distribute data signals between the first OLT 110, the second OLT 115, and the ONTs 120. Alternatively, the ODN 130 may comprise one or a plurality of active components, such as optical amplifiers. Additionally, the ODN 130 may comprise a distributor coupler 135, which may be configured to switch the different corresponding downstream and upstream wavelength channels between the first OLT 110, the second OLT 115, and the ONTs 120. The ODN 130 may typically extend from the first OLT 110 and the second OLT 115 to the ONTs 120 in a branching configuration as shown in FIG. 1, but may be alternatively configured in any other point-to-multi-point configuration.

Figure 2:
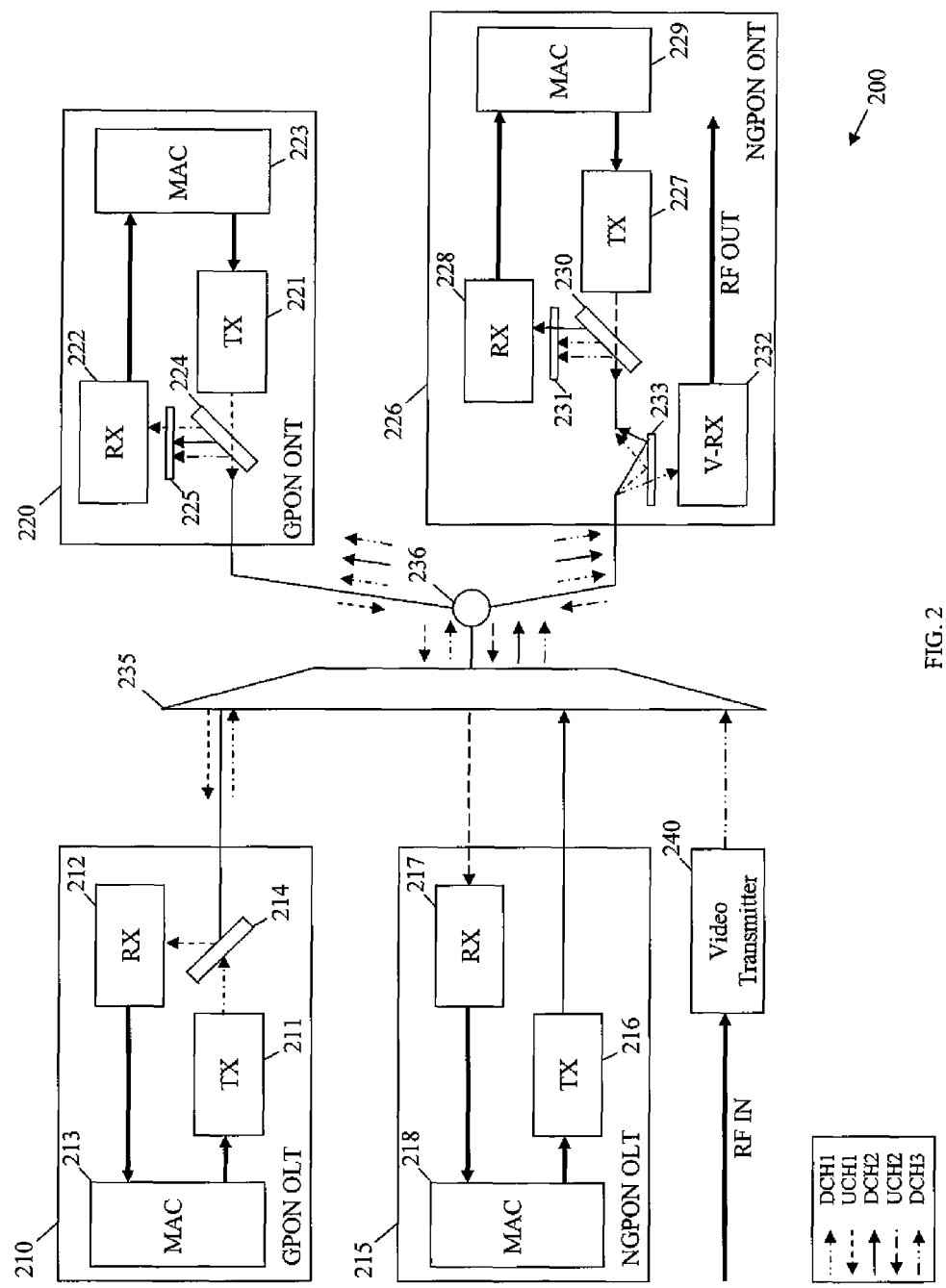
FIG. 2 is a schematic diagram of another embodiment of a PON system.

FIG. 2 illustrates another embodiment of a PON system 200, which may be an integrated XGPON/GPON system. Accordingly, the PON system 200 may support both GPON and XGPON bandwidths, wavelengths, and other requirements. The PON system 200 may comprise a GPON OLT 210, a XGPON or NGA PON (NGPON) OLT 215, at least one GPON ONT 220, and at least one NGPON ONT 226. The PON system 200 may also comprise a wavelength division multiplexer (WDM) coupler 235, which may couple the GPON OLT 210 and the NGPON OLT 215 to the GPON ONT 220 and the NGPON ONT 226 via a splitter 236. The GPON OLT 210 may communicate with the GPON ONT 220 via a first downstream wavelength channel (DCH1) and a first upstream wavelength channel (UCH1). Additionally, the NGPON OLT 215 may communicate with the NGPON ONT 226 via a second downstream wavelength channel (DCH2) and at least a second upstream wavelength channel (UCH2). The WDM coupler 235 may be configured to switch the different upstream and downstream wavelength channels between the corresponding components of the PON system 200. Additionally, the PON system 200 may comprise a video transmitter 240, which may receive a video signal, e.g. from a server, convert the video signal from a radio frequency (RF) signal to an optical signal, and transmit the video signal in a third downstream wavelength channel (DCH3), e.g. to the NGPON ONT 226. In FIG. 2, the downstream and upstream channels are represented using different line types, as indicated in the legend of FIG. 2.

In an embodiment, the GPON OLT 210 may comprise a first OLT transmitter (TX) 211, a first OLT receiver (RX) 212, a first OLT media access control (MAC) module 213, and an OLT diplex filter 214. Both the first OLT TX 211 and the first OLT RX 212 may be coupled to the first OLT MAC module 213 and the OLT diplex filter 214, as shown in FIG. 2. The OLT diplex filter 214 may be coupled to the WDM coupler 235 via a fiber. The first OLT TX 211 may be configured to transmit downstream data to the GPON ONT 220 at a first OLT downstream bandwidth, e.g. at about 2.5 Gbps, and a first downstream wavelength channel, e.g. from about 1,480 nanometers (nm) to about 1,500 nm. The first downstream wavelength channel may comprise a continuous range of wavelengths or a set of plurality of discrete wavelengths. The first OLT RX 212 may be configured to receive upstream data from the GPON ONT 220 at a first upstream bandwidth, e.g. of about 1.25 Gbps, and a first upstream wavelength channel, e.g. from about 1,290 nm to about 1,330 nm. The first upstream wavelength channel may also comprise a continuous range of wavelengths or a set of plurality of discrete wavelengths. The OLT diplex filter 214 may be configured to direct the first downstream wavelength channel from the first OLT TX 211 to the WDM coupler 235 and redirect the first upstream wavelength channel from the WDM coupler 235 to the first OLT RX 212. The first OLT MAC module 213 may be configured to send downstream data to the first OLT TX 211, receive upstream data from the first OLT RX 212, and process both the downstream and upstream data.

In an embodiment, the NGPON OLT 215 may comprise a second OLT TX 216, a second OLT RX 217, and a second OLT MAC module 218. The second OLT TX 216 in the NGPON OLT 215 may be configured to transmit downstream data to the NGPON ONT 226 at a second downstream bandwidth, e.g. at about ten Gbps, and a second downstream wavelength channel, e.g. from about 1,575 nm to about 1,580 nm. The second downstream wavelength channel may comprise a continuous range of wavelengths or a set of plurality of discrete wavelengths. The second OLT RX 217 may be configured to receive upstream data from the NGPON ONT 226 at a second upstream bandwidth, e.g. at about 2.5 Gbps, and a second upstream wavelength channel, e.g. from about 1,260 nm to about 1,280 nm. The second upstream wavelength channel may also comprise a continuous range of wavelengths or a set of plurality of discrete wavelengths. The second OLT MAC module 218 may be configured to send downstream data to the second OLT TX 216, receive upstream data from the second OLT RX 217, and process both the downstream and upstream data.

Both the second OLT TX 216 and the second OLT RX 217 may be coupled to the second OLT MAC module 214 and to the WDM coupler 235 using a plurality of fibers instead of a single fiber. Specifically, the second OLT TX 216 may be coupled to the WDM coupler 235 via a first fiber and the second OLT RX 217 may be coupled to the WDM coupler 235 via a second fiber. The cost and insertion loss for using an additional fiber in the PON system 200 may be less than the cost and insertion loss for using a single fiber and an OLT filter. Therefore, using separate fibers to transmit downstream data from the second OLT TX 216 and receive upstream data by the second OLT RX 217 may reduce overall system cost and insertion loss in comparison to using a single fiber and an OLT filter for the same purpose. The two separate fiber configurations may also reduce the quantity of filters needed in the WDM coupler 235, as described in detail below. Hence, the signal quality (e.g. the bit error ratio (BER)) may also be improved, which may be necessary to meet stringent optical power budget requirements in XGPONs or NGPONs.

The WDM coupler 235 may be configured to forward the first downstream wavelength channel from the GPON OLT 210 to the GPON ONT 220 and forward the second downstream wavelength channel from the NGPON OLT 215 to the NGPON ONT 226. Specifically, the WDM coupler 235 may receive the first downstream wavelength channel and the second downstream wavelength channel via different fibers, combine the two downstream wavelength channels, and send a combined downstream wavelength channel to the splitter 236. The splitter 236 may then split the combined downstream wavelength channel into at least two substantially similar portions that are directed to each of the GPON ONT 220 and the NGPON ONT 226. As such, both the GPON ONT 220 and the NGPON ONT 226 may initially obtain the first downstream wavelength channel and the second downstream wavelength channel. However, the receivers in the GPON ONT 220 and the NGPON ONT 226 may detect a different downstream wavelength channel from the two downstream wavelength channels, as described below. The WDM coupler 235 may also receive the video signal from the video transmitter 240, combine the video signal with the first downstream wavelength channel and the second downstream wavelength channel, and send the combined signals downstream.

The WDM coupler 235 may also be configured to forward the first upstream wavelength channel from the GPON ONT 220 to the GPON OLT 210 and forward the second upstream wavelength channel from the NGPON ONT 226 to the NGPON OLT 215. The splitter 236 may receive the first upstream wavelength channel and the second upstream wavelength channel via different fibers, combine the two upstream wavelength channels, and send a combined upstream wavelength channel to the WDM coupler 235. The WDM coupler 235 may then split (or demultiplex) the combined upstream wavelength channel into a plurality of upstream wavelength channels, e.g. based on the upstream channel wavelength. The upstream wavelength channels may be directed to the corresponding fibers coupled to the GPON ONT 220 and the NGPON ONT 226. As such, each of the GPON ONT 220 and the NGPON ONT 226 may receive its designated upstream channel via the corresponding fiber.

The GPON ONT 220 may comprise a first ONT TX 221, a first ONT RX 222, a first ONT MAC module 223, a first ONT diplex filter 224, and a first ONT filter 225. Specifically, the first ONT diplex filter 224 may be coupled to the WDM coupler 235 via a fiber, to the first ONT TX 221, and to the first ONT RX 222. The first ONT filter 225 may be a band pass filter coupled to the first ONT diplex filter 224 and the first ONT RX 222. Both the first ONT TX 221 and the first ONT RX 222 may be coupled to the first ONT MAC module 223. Based on the GPON ONT 220 configuration in FIG. 2, the first upstream wavelength channel may be forwarded in a first path from the first ONT TX 221 to the first ONT diplex filter 224 and then to the WDM coupler 235. Additionally, the first downstream wavelength channel may be forwarded in a second path from the WDM coupler 235 to the first ONT diplex filter 224, the first ONT filter 225, and then the first ONT RX 222.

The first ONT TX 221 may be configured to transmit upstream data to the GPON OLT 210 at the first upstream bandwidth (e.g. of about 1.25 Gbps) and the first upstream wavelength channel (e.g. from about 1,290 nm to about 1,330 nm). The first ONT RX 222 may be configured to receive downstream data from the GPON OLT 210 at the first downstream bandwidth (e.g. of about 2.5 Gbps) and the first downstream wavelength channel (e.g. from about 1,480 nm to about 1,500 nm). The first ONT MAC module 223 may be configured to send upstream data to the first ONT TX 221, receive downstream data from the first ONT RX 222, and process both the downstream and upstream data. The first ONT diplex filter 224 may be configured to direct the first upstream wavelength channel from the first ONT TX 221 to the WDM coupler 235 and redirect the first, the second, and the third downstream wavelength channels from the WDM coupler 235 to the first ONT filter 225. The first ONT filter 225 may be configured to block from the first ONT RX 222 the second downstream wavelength channel, which may be transmitted from the NGPON 215 through the WDM coupler 235. The first ONT filter 225 may also be configured to block from the first ONT RX 222 the third downstream wavelength channel (e.g. the video signal), which may be transmitted from the video transmitter 240 through the WDM coupler 235. As such, the GPON ONT 220 may communicate with the GPON OLT 210 but not the NGPON OLT 215 or the video transmitter 240. Thus, all PON system 200 components other than the GPON OLT 210 may be transparent to the GPON ONT 220.

The NGPON ONT 226 may comprise a second ONT TX 227, a second ONT RX 228, a second ONT MAC module 229, a second ONT diplex filter 230, and a second ONT filter 231. Additionally, the NGPON ONT 226 may comprise a video receiver (V-RX) 232 and a filter 233. The filter 233 may be a band stop filter coupled to the WDM coupler 235, e.g. via a fiber, and may be coupled to the second ONT diplex filter 230 and the V-RX 232. The second ONT diplex filter 230 may be coupled to the second ONT filter 231 and the second ONT TX 227. The second ONT filter 231 may be a band pass filter coupled to the second ONT RX 228. Both the second ONT TX 227 and the second ONT RX 228 may be coupled to the second ONT MAC module 229. Based on the NGPON ONT 226 configuration in FIG. 2, the second upstream wavelength channel may be forwarded in a first path from the second ONT TX 227 to the second ONT diplex filter 230, the filter 233, and then the WDM coupler 235. Additionally, the second downstream wavelength channel may be forwarded in a second path from the WDM coupler 235 to the filter 233, the second ONT diplex filter 230, the second ONT filter 231, and then the second ONT RX 228.

The second ONT TX 227 may be configured to transmit upstream data to the NGPON OLT 215 at the second upstream bandwidth (e.g. of about 2.5 Gbps) and the second upstream wavelength channel (e.g. from about 1,260 nm to about 1,280 nm). The second ONT RX 228 may be configured to receive downstream data from the NGPON ONT 215 at the second downstream bandwidth (e.g. of about ten Gbps) and the second downstream wavelength channel (e.g. from about 1,575 nm to about 1,580 nm). The second ONT MAC module 229 may be configured to send upstream data to the second ONT TX 227, receive downstream data from the second ONT RX 228, and process both the downstream and upstream data. The second ONT diplex filter 230 may be configured to direct the second upstream wavelength channel from the second ONT TX 227 to the WDM coupler 235.

The filter 233 may be configured to reflect the first and second downstream wavelength channel from the WDM coupler 235 to the second ONT diplex filter 230 and may transmit at least a portion of the video signal in the third downstream wavelength channel (from the video transmitter 240) to the V-RX 232. The V-RX 232 may receive the video signal from the filter 233, covert the video signal from an optical signal to a RF signal, and forward the RF signal at an output. The second ONT diplex filter 230 may redirect the first and second downstream wavelength channels from the filter 233 to the second ONT filter 231 and the second upstream wavelength channel from the second ONT TX 227 to the filter 233. The second ONT filter 231 may be configured to transmit the second downstream wavelength channel to the second ONT RX 228 and block the first downstream wavelength channel from the second ONT RX 228. As such, the NGPON ONT 220 may communicate with the NGPON OLT 215 but not the GPON OLT 210. In some embodiments, the second ONT filter 231 may also block the video signal of the video transmitter 240 from reaching the second ONT RX 228. Thus, all PON system 200 components other than the NGPON OLT 215 may be transparent to the second ONT RX 228 in the NGPON ONT 226.

As shown in FIG. 2, the two separate fiber configuration between the OLT (e.g. NGPON OLT 215) and the coupler (e.g. WDM coupler 235) may be implemented in an integrated XGPON/PON system to switch the downstream and upstream data without using filters in the OLT, which may reduce system cost and insertion loss and hence improved signal quality. Additionally, using two fibers to separate downstream and upstream transmissions between the OLT and the coupler may reduce the quantity of filters in the coupler and thus further reduce cost and improve signal reliability. In the case of XGPON communications, the power budget for upstream data transmission may be limited due to higher bit rate requirements in the receiver for burst mode signals. For example, a burst mode receiver may have about two decibels (dB) additional power loss in comparison to a continuous burst mode receiver. As such, a conventional coupler, which may be coupled via a single fiber to the OLT, may comprise a quantity of filters that may have an insertion loss from about one to about three dB. Such insertion loss may limit the XGPON power budget, and thus limit the transmission distance or the number of users in the XGPON. Thus, using a coupler configuration that comprises a reduced quantity of filters may be beneficial or necessary.

Figure 3:
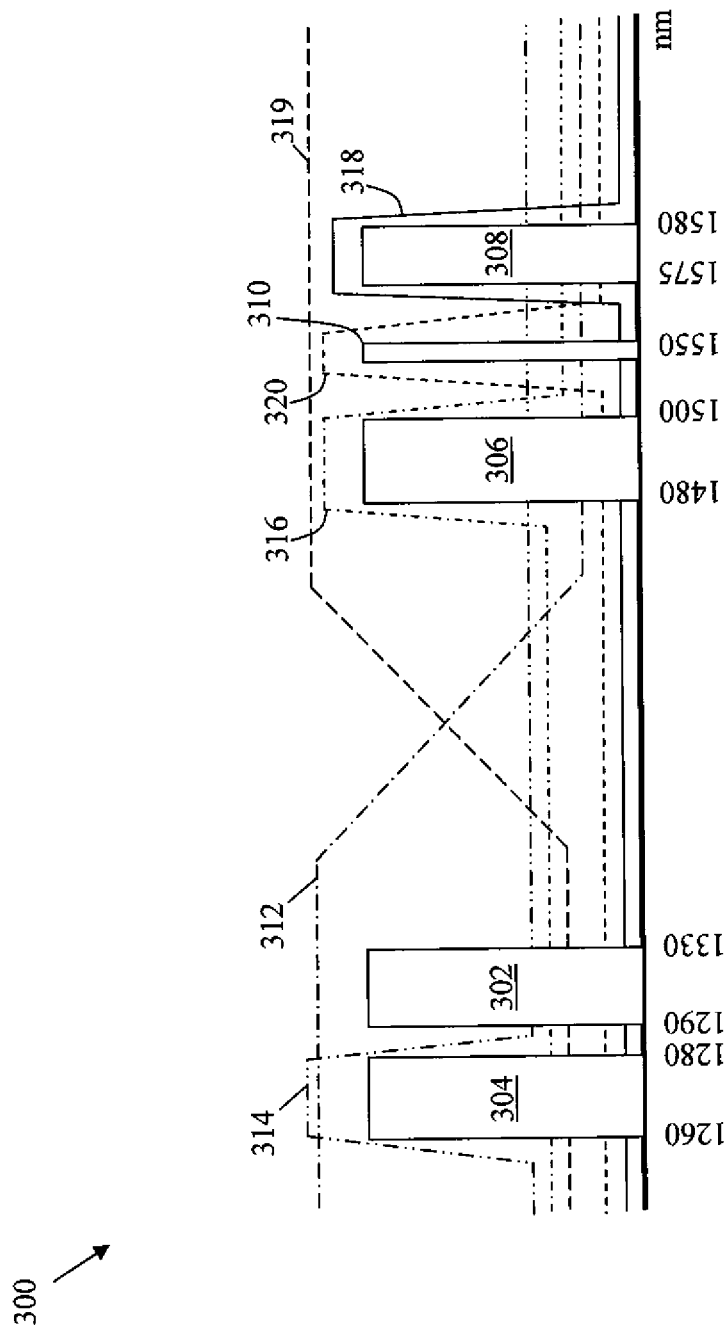
FIG. 3 is an illustration of downstream and upstream wavelength channels.

FIG. 3 illustrates an embodiment of a plurality of downstream and upstream wavelength channels 300, which may be supported in a PON system, such as the PON system 200. Specifically, the downstream and upstream channels may be allowed based on the transmission spectrum properties of the components in the PON system. The upstream and downstream wavelength channels 300 may comprise a first upstream wavelength channel 302, a second upstream wavelength channel 304, a first downstream wavelength channel 306, a second downstream wavelength channel 308, and a downstream video wavelength channel 310. The transmission spectrums of the PON components may comprise a first upstream transmission spectrum 312, a second upstream transmission spectrum 314, a first downstream transmission spectrum 316, a second downstream transmission spectrum 318, a third downstream transmission spectrum 319, and a downstream video transmission spectrum 320.

As shown in FIG. 3, the first upstream transmission spectrum 312 may overlap with the first upstream wavelength channel 302 and the second upstream wavelength channel 304. The second upstream transmission spectrum 314 may substantially overlap with the second upstream wavelength channel 304. The first upstream wavelength channel 302 may be transmitted from a GPON ONT (e.g. GPON ONT 220) and received by a GPON OLT (e.g. GPON OLT 210), and may comprise at least one optical signal having a wavelength from about 1,290 nm to about 1,330 nm. The second upstream wavelength channel 304 may be transmitted from a NGPON ONT (e.g. NGPON ONT 226) and received by a NGPON OLT (e.g. NGPON OLT 215), and may comprise at least one optical signal having a wavelength from about 1,260 nm to about 1,280 nm.

Specifically, the first upstream wavelength channel 302 may be transmitted using a first ONT TX (e.g. first ONT TX 221) in the GPON ONT via a first upstream port of a WDM coupler (e.g. the WDM coupler 235), which may support the first upstream transmission spectrum 312. The second upstream wavelength channel 304 may be transmitted using a second ONT TX (e.g. second ONT TX 227) in the NGPON ONT via a second upstream port of the WDM coupler, which may support the second upstream transmission spectrum 314. Since the first upstream transmission spectrum 312 may overlap with the first upstream wavelength channel 302, the first upstream port may allow the first upstream wavelength channel 302 to reach the GPON OLT. Additionally, since the second upstream transmission spectrum 314 may substantially overlap with the second upstream wavelength channel 304, the second upstream port may allow the second upstream wavelength channel 304 to reach the NGPON OLT. The second upstream port may also block the first upstream wavelength channel 302 from the NGPON OLT, since the second upstream transmission spectrum 314 may not overlap with the first upstream wavelength channel 302.

The third downstream transmission spectrum 319 may overlap with the first downstream wavelength channel 306 and the second downstream wavelength channel 308. Additionally, the first downstream transmission spectrum 316 may substantially overlap with the first downstream wavelength channel 306, and the second downstream transmission spectrum 318 may substantially overlap with the second downstream wavelength channel 308. The first downstream wavelength channel 306 may be transmitted from the GPON OLT and received by the GPON ONT, and may comprise at least one optical signal having a wavelength from about 1,480 nm to about 1,500 nm. The second downstream wavelength channel 308 may be transmitted from the NGPON OLT and received by the NGPON ONT, and may comprise at least one optical signal having a wavelength from about 1,575 nm to about 1,580 nm.

Specifically, the first downstream wavelength channel 306 may be transmitted using a first OLT TX (e.g. first OLT TX 211) in the GPON OLT via a downstream port of the WDM coupler and may be received in the GPON ONT via a first ONT filter (e.g. first ONT filter 225). The second downstream wavelength channel 308 may be transmitted using a second OLT TX (e.g. second OLT TX 216) in the NGPON OLT via the downstream port of the WDM coupler and may be received in the NGPON ONT via a second ONT filter (e.g. second ONT filter 231). The downstream port of the WDM coupler may support the third downstream transmission spectrum 319, the first ONT filter may support the first downstream transmission spectrum 316, and the second ONT filter may support the second downstream transmission spectrum 318.

Since both the third downstream transmission spectrum 319 and the first downstream transmission spectrum 316 may overlap with the first downstream wavelength channel 306, the downstream port and the first ONT filter may allow the first downstream wavelength channel 306 to reach the GPON ONT. Additionally, since both the third downstream transmission spectrum 319 and the second downstream transmission spectrum 318 may overlap with the second downstream wavelength channel 308, the downstream port and the second ONT filter may allow the second downstream wavelength channel 308 to reach the NGPON ONT. Further, since the first downstream transmission spectrum 316 may not overlap with the second downstream wavelength channel 318, the first ONT filter may block the second downstream wavelength channel 308 from the GPON ONT. Similarly, since the second downstream transmission spectrum 318 may not overlap with the first downstream wavelength channel 316, the second ONT filter may block the first downstream wavelength channel 306 from the NGPON ONT.

The third downstream transmission spectrum 319 may also overlap with the downstream video wavelength channel 310 and the downstream video transmission spectrum 320 may substantially overlap with the downstream video wavelength channel 310. The downstream video wavelength channel 310 may be transmitted from a video server (e.g. at a CO) and received by the NGPON ONT, and may comprise at least one optical signal having a wavelength equal to about 1,550 nm. For instance, the downstream video stream may comprise a plurality of video channels that are transmitted at a plurality of wavelengths around 1,550 nm. Specifically, the downstream video wavelength channel 310 may be transmitted using a video transmitter at the CO (e.g. video transmitter 240) in the NGPON OLT via the downstream port of the WDM coupler and may be received in the NGPON ONT via a filter (e.g. filter 233), which may support the downstream video transmission spectrum 320. Since both the third downstream transmission spectrum 319 and the downstream video transmission spectrum 320 may overlap with the downstream video wavelength channel 310, the downstream port and the filter may allow the downstream video wavelength channel 310 to reach a video receiver in the NGPON ONT. Since the downstream video transmission spectrum 320 may not overlap with the first downstream wavelength channel 316 and the second downstream wavelength channel 318, the filter may also block the two downstream channels from the video receiver.

Figure 4A:
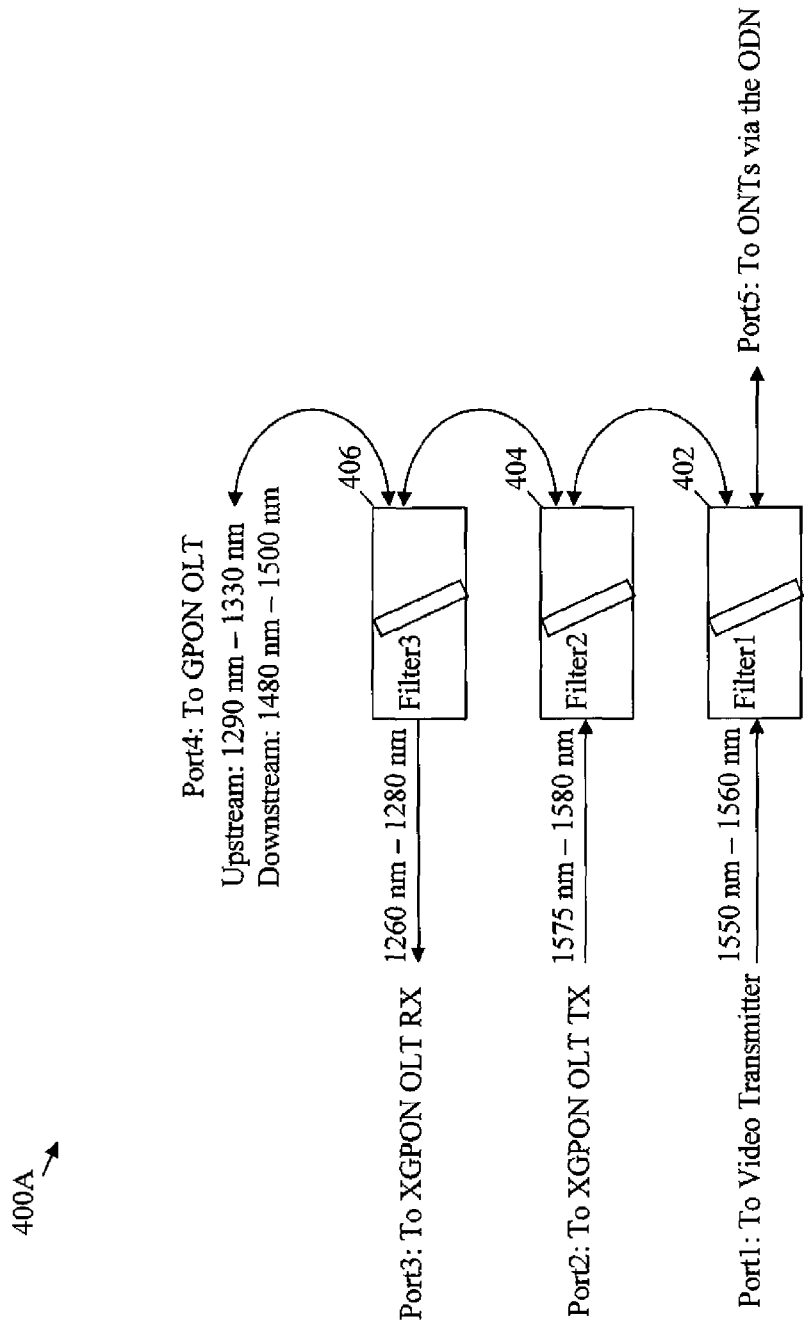
FIG. 4A is a schematic diagram of an embodiment of a coupler.

FIG. 4A illustrates an embodiment of a coupler 400A, which may be configured substantially similar to the WDM coupler 235 in the PON system 200 or the coupler 135 in the PON system 100. The coupler 400A may comprise a first port (Port1) that may be coupled to a video service provider (e.g. in the CO), a second port (Port2) that may be coupled to a XGPON OLT TX, a third port (Port3) that may be coupled to a XGPON OLT RX, a fourth port (Port4) that may be coupled to a GPON OLT, and at least one fifth port (Port5) that may be coupled to a plurality of ONTs via the ODN. The coupler 400A may comprise a plurality of filters, which may be diplex filters coupled to the ports and may determine the wavelength channels for each port. Specifically, the coupler 400A may comprise a first filter 402 (Filter1), a second filter 404 (Filter2), and a third filter 406 (Filter3).

The first filter 402 may be coupled to the first port, the fifth port, and the second filter 404, and may be configured to transmit from the first port to the fifth port a downstream video wavelength channel. The first filter 402 may reflect any other incoming wavelengths, e.g. between the fifth port and the second filter 404. The second filter 404 may be coupled to the second port, the first filter 402, and the third filter 406, and may be configured to transmit from the second port to the first filter 402 a XGPON downstream wavelength channel. The second filter 404 may reflect any other incoming wavelengths, e.g. between the first filter 402 and the third filter 406. The third filter 406 may be coupled to the third port, the second filter 404, and the fourth port, and may be configured to transmit from the second filter 404 to the third port a XGPON upstream wavelength channel. The third filter 406 may reflect any other incoming wavelengths, e.g. between the second filter 404 and the fourth port. These reflected wavelengths may comprise a GPON upstream wavelength channel and a GPON downstream wavelength channel.

Figure 4B:
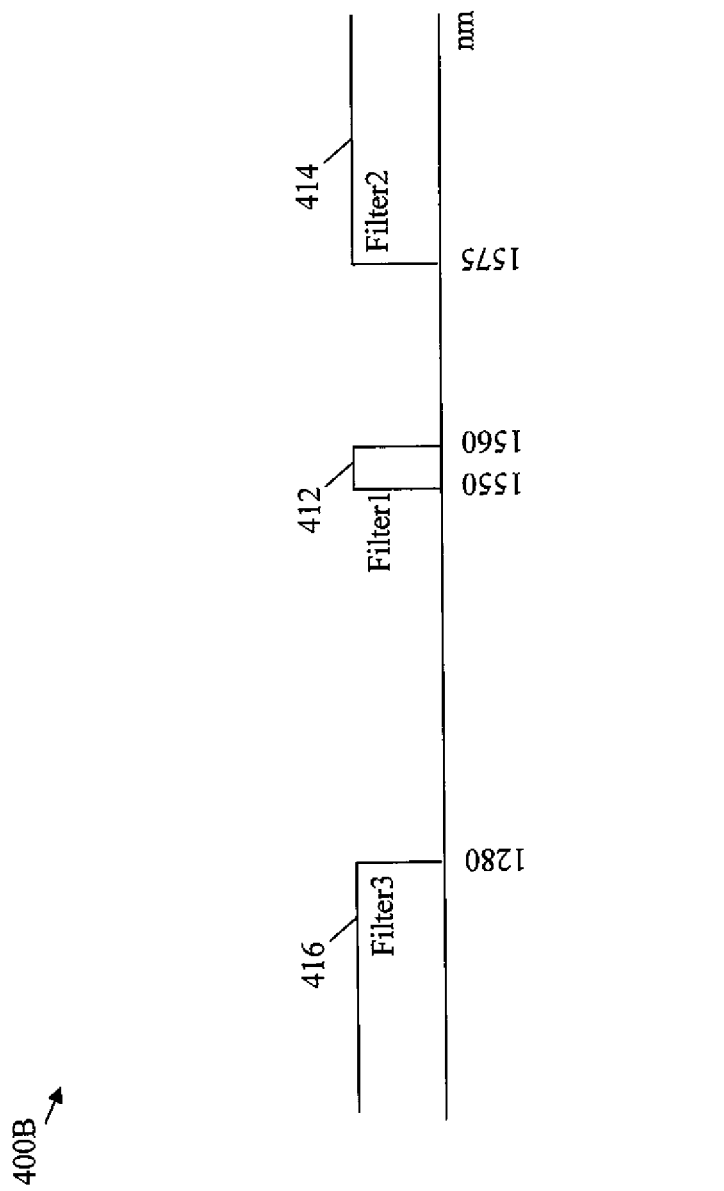
FIG. 4B is a schematic diagram of a plurality of transmission spectrums of the coupler in FIG. 4A.

FIG. 4B shows a plurality of transmission spectrums 400B that correspond to the filters in the coupler 400A. The transmission spectrums 400B may comprise a first transmission spectrum 412 for the first filter 402, a second transmission spectrum 414 for the second filter 404, and a third transmission spectrum 416 for the third filter 406. The first transmission spectrum 412 may comprise a plurality of wavelengths from about 1,550 nm to about 1,560 nm, which may overlap with the downstream video wavelength channel without the other wavelength channels. The second transmission spectrum 414 may comprise a plurality of wavelengths greater than about 1,575 nm or a plurality of wavelengths between about 1,575 nm and about 1,580 nm, which may overlap with the XGPON downstream wavelength channel without the other wavelength channels. The third transmission spectrum 416 may comprise a plurality of wavelengths less than about 1,280 nm or a plurality of wavelengths between about 1,260 nm and about 1,280 nm, which may overlap with the XGPON upstream wavelength channel without the other wavelength channels.

Accordingly, the first filter 402 may transmit the downstream video wavelength channel from the first port to the fifth port but may reflect other wavelength channels between the fifth port and the second filter 404. The second filter 404 may transmit the XGPON downstream wavelength channel from the second port to the first filter 402 and may reflect other wavelength channels between the first filter 402 and the third filter 406. The third filter 406 may transmit the XGPON upstream wavelength channel, which may be reflected from the second filter 404, to the third port and may reflect other wavelength channels between the second filter 404 and the fourth port. Additionally, the spectrum gap between the first transmission spectrum 412 and the third transmission spectrum 416 may overlap with the GPON upstream and downstream wavelength channels. Consequently, the GPON downstream wavelength channel and the GPON upstream wavelength channel may be reflected by the first filter 402, the second filter 404, and the third filter 406 between the fourth port and the fifth port.

The quantity of filters in the coupler 400A may be less than the quantity of filters used in a conventional coupler that is coupled via a single port or fiber to the OLT. For instance, in the case of a single fiber between the coupler and the OLT for both downstream and upstream channels, the coupler may comprise at least about four filters, where at least about two filters may be coupled in series to exchange XGPON downstream and upstream channels via the single fiber. Since two separate fibers are used to connect the coupler 400A to the XGPON OLT, one filter (e.g. first filter 402) instead of two filters may be used in the coupler 400A to exchange XGPON downstream and upstream channels. Further, using two separate fibers to separate the XGPON downstream and upstream wavelength channels may eliminate the need for using additional optical elements, e.g. a splitter or diplex filter, at the XGPON OLT to achieve the same purpose. Reducing the quantity of filters and/or optical elements in the PON system may substantially reduce system cost and insertion losses.

Figure 5:
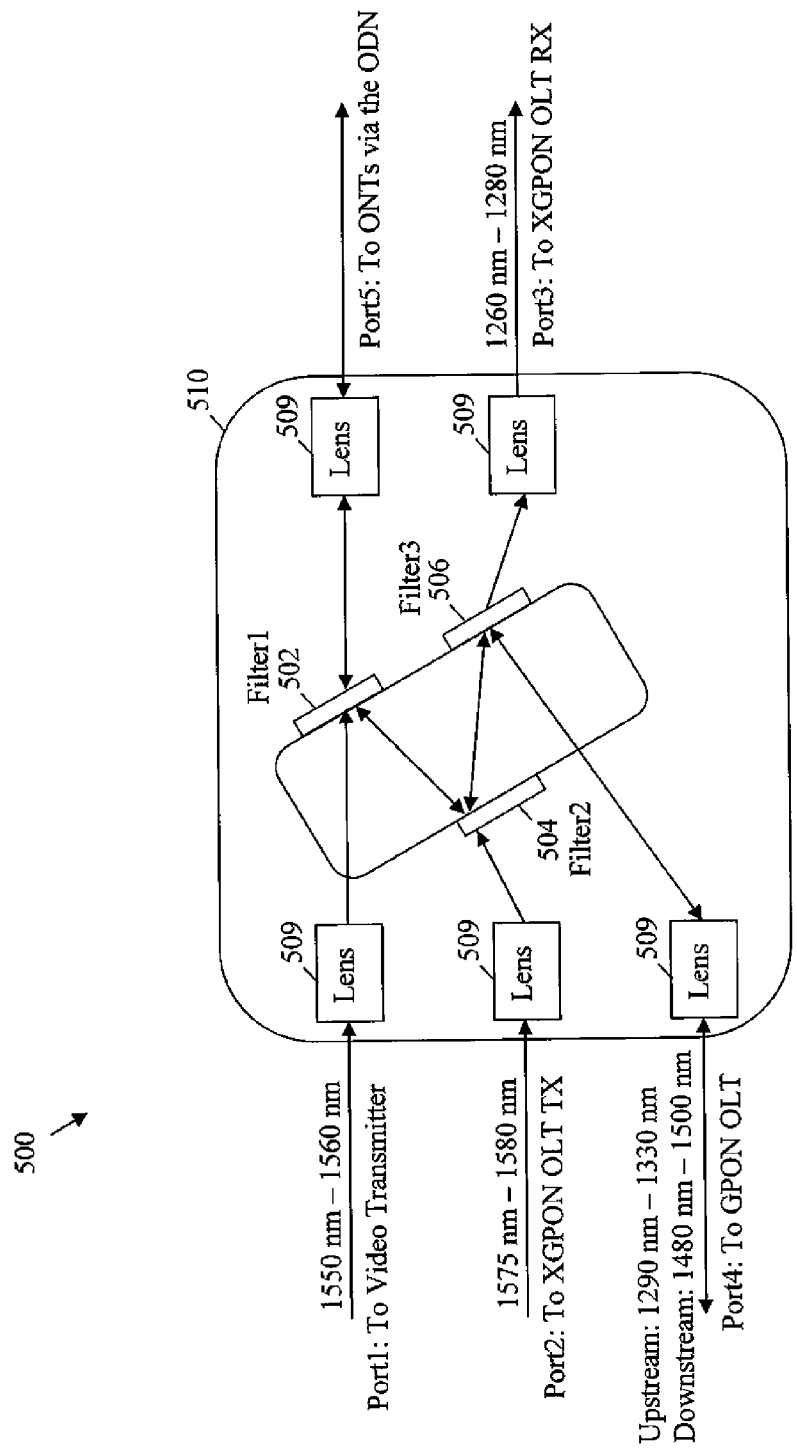
FIG. 5 is a schematic diagram of another embodiment of a coupler.

FIG. 5 illustrates another embodiment of a coupler 500, which may be configured substantially similar to the WDM coupler 235 in the PON system 200 or the coupler 135 in the PON system 100. The coupler 500 may be an integrated WDM coupler, e.g. on a chip or optical board, which may have lower production cost and may be more suitable for system integration in comparison to other couplers that comprise discrete components, such as the coupler 400A. Similar to the coupler 400A, the coupler 500 may comprise a first port (Port1) that may be coupled to a video service provider (e.g. in the CO), a second port (Port2) that may be coupled to a XGPON OLT TX, a third port (Port3) that may be coupled to a XGPON OLT RX, a fourth port (Port4) that may be coupled to a GPON OLT, and at least one fifth port (Port5) that may be coupled to a plurality of ONTs via the ODN.

The coupler 500 may comprise a plurality of filters, which may be diplex filters coupled to the ports and may determine the wavelength channels for each port. The coupler 500 may comprise a first filter 502 (Filter1), a second filter 504 (Filter2), and a third filter 506 (Filter3), which may be configured substantially similar to the corresponding components in the coupler 400A. As such, the first filter 502 may support the first transmission spectrum 412, transmit the downstream video wavelength channel from the first port to the fifth port, and reflect other wavelength channels between the fifth port and the second filter 504. The second filter 504 may support the second transmission spectrum 414, transmit the XGPON downstream wavelength channel from the second port to the first filter 502, and reflect other wavelength channels between the first filter 502 and the third filter 506. The third filter 506 may support the third transmission spectrum 416, transmit the XGPON upstream wavelength channel reflected from the second filter 504 to the third port, and reflect other wavelength channels between the second filter 504 and the fourth port. The first filter 502, the second filter 504, and the third filter 506 may also reflect the GPON downstream wavelength channel and the GPON upstream wavelength channel between the fourth port and the fifth port.

Additionally, the filters may be coupled to a plurality of lenses 509 that may be arranged to focus the optical beams that correspond to the downstream and upstream wavelength channels onto the filters and align the optical beams with the corresponding ports. The filters 502, 504, 506 and the lenses 509 may be integrated on a chip 510, such as a glass or silicon substrate. Although five lenses 509 are shown in FIG. 5, other embodiments of the coupler 500 may comprise any quantity of lenses. The filters and the lenses may also be arranged in any suitable order on the chip 510.

Figure 6A:
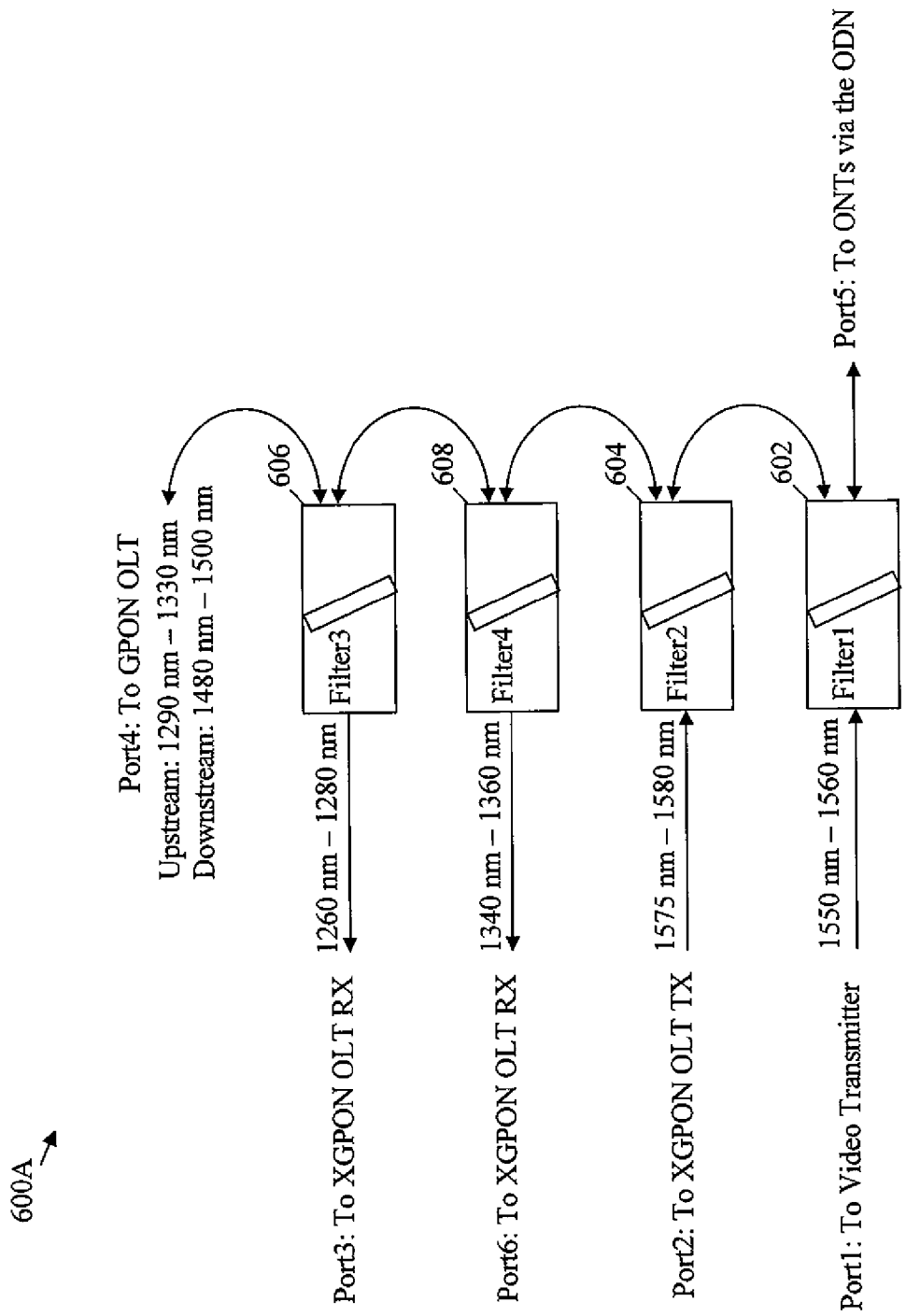
FIG. 6A is a schematic diagram of another embodiment of a coupler.

In some systems, the XGPON OLT may use a plurality of upstream wavelength channels to communicate with at least one ONT. In such a case, the coupler may be configured to provide about two upstream wavelength channels to the XGPON OLT. FIG. 6A illustrates another embodiment of a coupler 600A, which may be configured substantially similar to the WDM coupler 235 in the PON system 200 or the coupler 135 in the PON system 100 but provides a plurality of upstream wavelength channels.

Similar to the coupler 400A, the coupler 600A may comprise a first port (Port1) that may be coupled to a video service provider, a second port (Port2) that may be coupled to a XGPON OLT TX, a third port (Port3) that may be coupled to a XGPON OLT RX, a fourth port that may be coupled to a GPON OLT, and at least one fifth port (Port5) that may be coupled to a plurality of ONTs via the ODN. The coupler 600A may comprise a first filter 602 (Filter1), a second filter 604 (Filter2), and a third filter 606 (Filter3), which may be configured substantially similar to the corresponding components in the coupler 400A. Additionally, the coupler 600A may comprise a sixth port (Port6) that may be coupled to the XGPON OLT TX, and a fourth filter 608 (Filter4) that may be coupled to the sixth port, the second filter 604, and the third filter 606. The remaining ports and filters of the coupler 600A may be arranged and coupled to each other as shown in FIG. 6A.

The first filter 602 may be configured to transmit the downstream video wavelength channel from the first port to the fifth port and reflect any other incoming wavelengths between the fifth port and the second filter 604. The second filter 604 may be configured to transmit the XGPON downstream wavelength channel from the second port to the first filter 602 and reflect any other incoming wavelengths between the first filter 602 and the fourth filter 608. The third filter 606 may be configured to transmit a first XGPON upstream wavelength channel from the fourth filter 608 to the third port and reflect any other incoming wavelengths between the fourth filter 608 and the fourth port. The fourth filter 608 may be configured to transmit a second XGPON upstream wavelength channel from the second filter 604 to the sixth port and reflect any other incoming wavelengths between the second filter 604 and the third filter 606. The first filter 602, the second filter 604, the third filter 606, and the fourth filter 608 may reflect the GPON upstream wavelength channel and the GPON downstream wavelength channel between the fourth port and the fifth port.

Figure 6B:
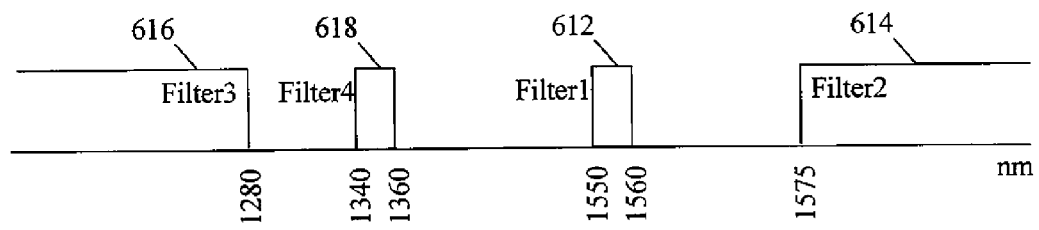
FIG. 6B is a schematic diagram of a plurality of transmission spectrums of the coupler in FIG. 6A.

FIG. 6B shows a plurality of transmission spectrums 600B that correspond to the filters in the coupler 600A. The transmission spectrums 600B may comprise a first transmission spectrum 612 for the first filter 602, a second transmission spectrum 614 for the second filter 604, and a third transmission spectrum 616 for the third filter 606, and a fourth transmission spectrum 618 for the fourth filter 608. The first transmission spectrum 612, the second transmission spectrum 614, and the third transmission spectrum 616 may be substantially similar to the transmission spectrums of the corresponding components of the coupler 400A.

Additionally, the fourth transmission spectrum 618 may comprise a plurality of wavelengths from about 1,340 nm to about 1,360 nm, which may overlap with the second XGPON upstream wavelength channel without the other wavelength channels. Accordingly, the fourth filter 608 may transmit the second XGPON upstream wavelength channel, which may be reflected from the second filter 604, to the sixth port and may reflect other wavelength channels between the second filter 604 and the third filter 606. The spectrum gap between the first transmission spectrum 612 and the fourth transmission spectrum 618 may overlap with the GPON downstream wavelength channel, and the spectrum gap between the fourth transmission spectrum 618 and the third transmission spectrum 616 may overlap with the GPON upstream wavelength channel. Thus, the GPON downstream wavelength channel and the GPON upstream wavelength channel may be reflected by the first filter 602, the second filter 604, the third filter 606, and the fourth filter 608 between the fourth port and the fifth port.

The quantity of filters in the coupler 600A may be less than the quantity of filters used in a conventional coupler that connects to the OLT via a single fiber and that supports two XGPON upstream wavelength channels. For instance, in the case of a single fiber between the coupler and the OLT for both upstream channels and downstream channels, the coupler may comprise at least about six filters, where at least about four filters may be used to exchange XGPON downstream and upstream channels via the single fiber. Instead, two separate fibers are used to connect the coupler 600A to the XGPON OLT and therefore two filters (e.g. first filter 602 and fourth filter 604) may be used instead of four filters to exchange XGPON downstream and upstream channels, which may substantially reduce insertion loss and cost.

Figure 7:
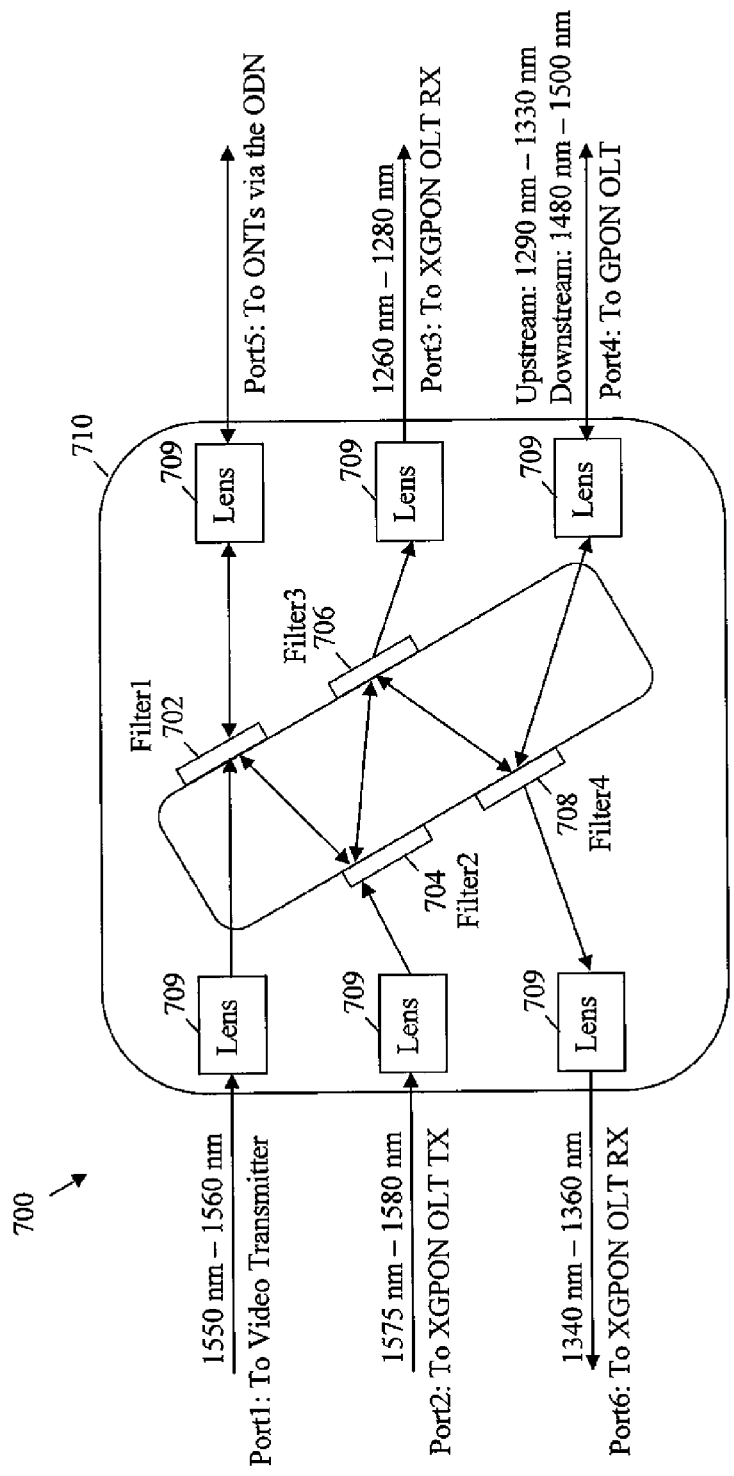
FIG. 7 is a schematic diagram of another embodiment of a coupler.

FIG. 7 illustrates another embodiment of a coupler 700, which may be an integrated WDM coupler configured substantially similar to WDM coupler 235 in the PON system 200 or the coupler 135 in the PON system 100. Similar to the coupler 600A, the coupler 700 may comprise about six ports that may be connected to the same or substantially similar PON components. The coupler 700 may also comprise a first filter 702, a second filter 704, a third filter 706, and a fourth filter 708, which may be configured substantially similar to the filters in the coupler 600A and may support the same transmission spectrums and wavelength channels. Additionally, the filters may be coupled to a plurality of lenses 709 that may be arranged to focus the optical beams that correspond to the downstream and upstream channels onto the filters and align the optical beams with the corresponding ports, as shown in FIG. 7. The filters 702, 704, 706, and 708 and the lenses 709 may be integrated on a chip 710, such as a glass or silicon substrate, which may have lower production cost and may be more suitable for system integration than the coupler 600A. Although six lenses 709 are shown in FIG. 7, other embodiments of the integrated coupler 700 may comprise any quantity of lenses. The filters and the lenses may also be arranged in any suitable order on the chip 710.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a wavelength division multiplexing (WDM) coupler configured to couple to a next generation access (NGA) optical line terminal (OLT), to a non-NGA OLT, and to a plurality of optical network terminals (ONTs),
wherein the NGA OLT comprises an optical transmitter and an optical receiver,
wherein the ONTs comprise NGA ONTs and non-NGA ONTs,
wherein the WDM coupler is configured to couple to the optical transmitter via a first fiber, to the optical receiver via a second fiber, and to the non-NGA OLT via a third fiber,
wherein the WDM coupler is further configured to couple to a video transmitter,
wherein each NGA ONT comprises a splitting filter configured to couple to the WDM coupler, a second optical transmitter coupled to the splitting filter, a second optical receiver coupled to the splitting filter, a video receiver, a first band pass filter coupled to the video receiver and positioned between the splitting filter and the WDM coupler,
wherein the first band pass filter is configured to reflect a first downstream wavelength channel and a second downstream wavelength channel from the WDM coupler to the splitting filter and to let pass at least a portion of a video signal in a third downstream wavelength channel to the video receiver.

2. The apparatus of claim 1, wherein there are not any filters positioned between the WDM coupler, the optical transmitter, and the optical receiver.

3. The apparatus of claim 1, wherein the non-NGA OLT comprises a third optical transmitter and a third optical receiver, and wherein the third optical transmitter and the third optical receiver are only coupled to the WDM coupler via the third fiber.

4. The apparatus of claim 3, wherein the non-NGA OLT comprises a filter positioned between the third optical transmitter, the third optical receiver, and the WDM coupler.

5. The apparatus of claim 1, wherein each NGA ONT further comprises a band pass filter positioned between the splitting filter and the second optical receiver.

6. The apparatus of claim 1, wherein each non-NGA ONT comprises a second splitting filter configured to couple to the WDM coupler, a fourth optical transmitter coupled to the second splitting filter, and a fourth optical receiver coupled to the second splitting filter, wherein the non-NGA ONTs only optically communicate with the non-NGA OLT, and wherein the NGA ONT only optically communicates with the NGA OLT.

7. A wavelength division multiplexing (WDM) coupler for a passive optical network (PON), comprising:
a first port configured to couple to an optical transmitter in a ten gigabits per second PON (XGPON) optical line terminal (OLT);
a second port configured to couple to an optical receiver in the XGPON OLT;
a third port configured to couple to a gigabit PON (GPON) OLT;
a fourth port configured to couple to a plurality of optical network units (ONTs);
a fifth port configured to couple to a video provider;
a first filter coupled to the first port, the second port, and the fourth port;
a second filter coupled to the first filter, the second port, and the third port, wherein the second filter is positioned between the first filter and the second port; and
a third filter coupled to the fourth port, the fifth port, and the first filter, wherein the third filter is positioned between the first filter and the fourth port,
wherein the third filter is configured to let pass a video downstream wavelength channel from the fifth port to the fourth port, and to let pass a GPON downstream wavelength channel and a GPON upstream wavelength channel between the first filter and the fourth port.

8. The WDM coupler of claim 7, wherein the first filter is configured to let pass the XGPON downstream wavelength channel from the first port to the third filter, to reflect the XGPON upstream wavelength channel from the third filter to the second filter, and to reflect the GPON upstream wavelength channel and the GPON downstream wavelength channel between the second filter and the third filter, wherein the second filter is configured to let pass the XGPON upstream wavelength channel from the first filter to the second port and to reflect the GPON downstream wavelength channel and the GPON upstream wavelength channel between the first filter and the third port.

9. The WDM coupler of claim 8, wherein the XGPON downstream wavelength channel is from about 1,575 nanometers (nm) to about 1,580 nm, wherein the XGPON upstream wavelength channel is from about 1,260 nm to about 1,280 nm, wherein the GPON downstream wavelength channel is from about 1,480 nm to about 1,500 nm, and wherein the GPON upstream wavelength channel is from about 1,290 nm to about 1,330 nm.

10. The WDM coupler of claim 8, wherein the WDM coupler further comprises:
a first lens positioned between the first filter and the first port;
a second lens positioned between the second filter and the second port;
a third lens positioned between the second filter and the third port;
a fourth lens positioned between the third filter and the fourth port; and a fifth lens positioned between the third filter and the fifth port, wherein the filters, the lenses, and the ports are integrated on a chip.

11. The WDM coupler of claim 8, wherein the WDM coupler further comprises:

a sixth port coupled to a second XGPON OLT receiver or the XGPON OLT receiver; and a fourth filter coupled to the third port, the sixth port, and the second filter, wherein the fourth filter is positioned between the third port and the second filter, wherein the third filter is configured to let pass a second XGPON upstream wavelength channel, wherein the first filter and the second filter are configured to reflect the second XGPON upstream wavelength channel, wherein the fourth filter is configured to let pass the second XGPON upstream wavelength channel from the second filter to the sixth port and to reflect the GPON downstream wavelength channel and the GPON upstream wavelength channel between the second filter and the third port.

12. The WDM coupler of claim 11, wherein the XGPON downstream wavelength channel is from about 1,575 nanometers (nm) to about 1,580 nm, wherein the first XGPON upstream wavelength channel is from about 1,260 nm to about 1,280 nm, wherein the GPON downstream wavelength channel is from about 1,480 nm to about 1,500 nm, wherein the second XGPON upstream wavelength channel is from about 1,340 to about 1,360 nm, and wherein the video downstream wavelength channel is from about 1,550 to about 1,560 nm.

13. An apparatus comprising:

a wavelength division multiplexing (WDM) coupler for a passive optical network (PON) coupled to an optical line terminal (OLT), a next generation access (NGA) OLT comprising an optical transmitter and an optical receiver, and a plurality of optical network units (ONUs), wherein the WDM coupler is coupled to the OLT via a first fiber and carries a first downstream wavelength range of 1,480 nanometers (nm) to 1,500 nm and in a first upstream wavelength range between the OLT and the ONUs of 1,290 nm to 1,330 nm, wherein the WDM coupler is coupled to the optical transmitter via a second fiber and carries a second downstream wavelength range from the NGA OLT to the ONUs of 1,524 nm to 1,625 nm, and wherein the WDM coupler is coupled to the optical receiver via a third fiber and carries a second upstream wavelength range of 1,260 nm to 1,280 nm.

14. The apparatus of claim 13, wherein the WDM coupler is coupled to a video transmitter via a fourth fiber and configured to carry in a third wavelength range from 1,550 nm to 1,560 nm from the video transmitter to the ONUs, and wherein the second downstream wavelength range comprises a range of 1,575 nm to 1,580 nm.

15. An apparatus comprising:

a wavelength division multiplexing (WDM) coupler configured to couple to a next generation access (NGA) optical line terminal (OLT), to a non-NGA OLT, and to a plurality of optical network terminals (ONTs), wherein the NGA OLT comprises an optical transmitter and an optical receiver, wherein the ONTs comprise NGA ONTs and non-NGA ONTs, wherein the WDM coupler is configured to couple to the optical transmitter via a first fiber and carry a second downstream wavelength range from the NGA OLT to the ONUs of 1,524 nanometers (nm) to 1,625 nm, wherein the WDM coupler is configured to couple to the optical receiver via a second fiber and carry a second upstream wavelength range of 1,260 nm to 1,280 nm, wherein the WDM coupler is configured to couple to the non-NGA OLT via a third fiber and carry a first downstream wavelength range of 1,480 nm to 1,500 nm and a first upstream wavelength range between the OLT and the ONUs of 1,290 nm to 1,330 nm, wherein the WDM coupler is configured to couple to the ONTs via a fourth fiber, and wherein the fourth fiber is the only optical fiber coupling the WDM coupler to the ONTs.

* * * * *